Jan. 3, 1939.  S. JENNINGS, JR  2,142,513
METHOD OF MANUFACTURING REFRIGERANT PLATES
Filed May 12, 1937
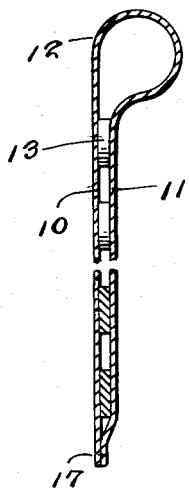
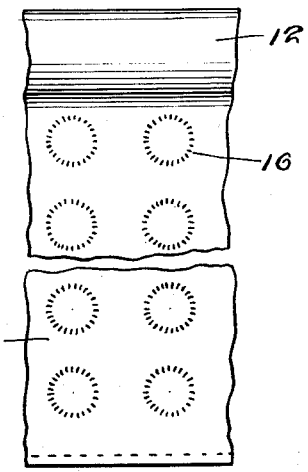
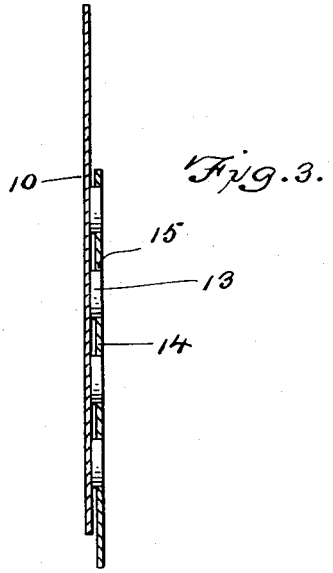
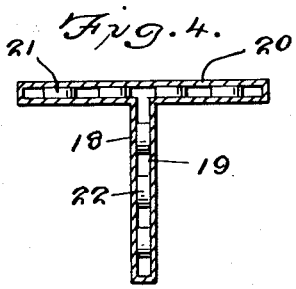
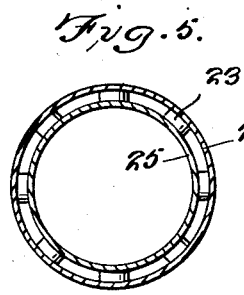
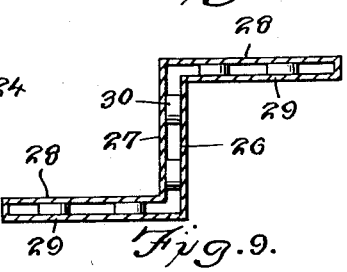
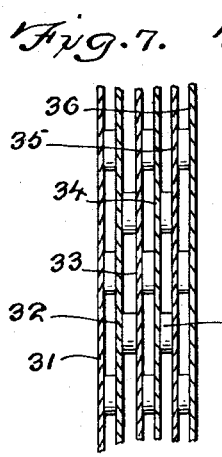
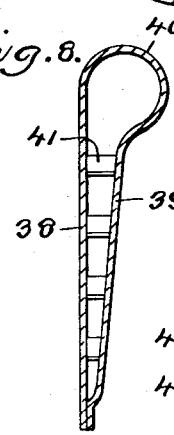
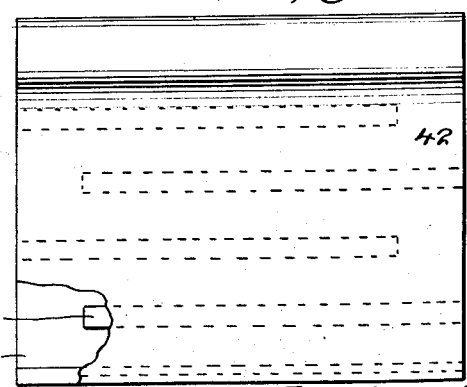
Samuel Jennings, Jr.
INVENTOR
BY Victor J. Evans & Co.
ATTORNEYS Patented Jan. 3, 1939

2,142,513

UNITED STATES PATENT OFFICE 2,142,513

METHOD OF MANUFACTURING REFRIGERANT PLATES

Samuel Jennings, Jr., Masury, Ohio.

Application May 12, 1937, Serial No. 142,246

2 Claims. (Cl. 113—118)

This invention relates to refrigerant plates and method of manufacturing same.

In frozen material dispensing cabinets and storage apparatus a volatile refrigerant is circulated through circulating members in the nature of hollow plates forming walls, top, bottom, and the like of the apparatus, the plates being heat conductors adapted to refrigerate the frozen material on display or being stored or dispensed.

One disadvantage of the refrigerant plates now in use is that leaks occur caused by expansion and contraction of the metal. During manufacture crazing and creeping of the metal near spot welded parts has never been completely overcome.

With the above disadvantages in mind the present invention provides a refrigerant plate which is devoid of crazing or small seams as well as weak spots to later produce leaks, and to obtain such a product the use of spacer slugs between the walls of a plate is promoted by a novel process of spot welding, these slugs permitting of circuitous passages of great magnitude and of ramifying contour existing between the walls of the plate so that higher refrigerating efficiency is obtained in the plate than hitherto possible.

A further object is to provide a gas chamber at the top of the plate between the walls thereof to promote efficient return of the gas to the compressor.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a vertical sectional view through a refrigerant plate constructed in accordance with the invention.

Figure 2 is a fragmentary side elevation of the plate shown in Figure 1.

Figure 3 is a longitudinal sectional view of a portion of the plate and showing a template carrying the slugs.

Figure 4 is a cross sectional view of a modified form of plate of T-shaped cross section.

Figure 5 is a cross sectional view of another modified form of plate, of circular cross section.

Figure 6 is another modified form of plate of angular cross section to fit around corners.

Figure 7 is a cross sectional view of another modified form of plate showing refrigerant passages alternating with passages for the material to be cooled such as milk.

Figure 8 is another modified form of the invention similar to the form shown in Figure 1 except that the walls of the plate converge toward the bottom of the plate.

Figure 9 is a side elevation of another modified form of the invention in which the circulating passages are formed by strips instead of slugs.

Referring now to the drawing in which like characters of reference designate similar parts in the various views, and referring more particularly to Figure 1, 10 and 11 designate metal sheets forming the walls of the refrigerant plate, the walls being formed integral at the top with a gas chamber 12 of substantially circular cross section. Metal slugs 13 are interposed between the sheets and form circuitous refrigerant circulating passages of great magnitude and of ramifying contour between the walls of the plate.

One method of manufacturing the refrigerant plate just described is as follows. The plate 10 is placed upon a table or other suitable support. A template 14 with openings 15 therein of sufficient diameter to receive the slugs 13, is superposed upon the plate 10 and the slugs 13 are then inserted through holes in the template to abut the plate endwise. The slugs are now spot-welded to the plate 10 the spot weld showing up on the outer surface of the plate as indicated at 16 in Figure 2. The plate 11 is now deformed to form the cylindrical gas chamber 12 and the plate is then forced down upon the slugs 13 and clamped against the slugs after removal of the template. The plate 11 is now spot-welded to the lugs 13, using the weld marks as guides for the welding tool, and as shown at 17 in Figure 1, the plate is spot-welded around the edge to the plate 10.

In carrying out the above process of manufacture it will be pointed out that only sufficient heat is applied to spot weld the slugs 13 at their end faces to the inner faces of the plates 10 and 11. Consequently no crazing or creeping of the metal near the spot weld can result since the weld is made in the fraction of a second and insufficient heat is used to heat the metal outside of the weld.

It will be further pointed out that the slugs perform the dual function of spacing the plates from each other and also attaching the plates to each other so that the plates cannot be collapsed either by vacuum or by pressure. Leaks are avoided since no perforations are formed in the plates to receive the slugs and weaken the plates, weakened spots, in practice, always developing into leaks and causing trouble.

In Figure 4 there is shown a modified form of the invention in which the refrigerant plate is substantially T-shape in cross section and may be formed of two angular plates 18 and 19 and a channel plate 20, or may be otherwise formed.

In manufacturing this type of refrigerant plate the slugs 21 may be spot-welded to the plate 20 and the slugs 22 may be spot-welded to the plate 18, while carried in suitable templates as heretofore described. The plate 19 may now be assembled to the plates 18 and 20 and the slugs 21 may be spot-welded to the plates 18 and 19 while the slugs 22 may be spot-welded to the plate 19.

In Figure 5 there is shown another modified form of the invention in which the refrigerant plate is circular in cross section. In manufacturing this plate the slugs 23 may be spot welded at one end to either of the concentric plates 24 and 25 and subsequently be spot welded at the other end to the other plate.

In Figure 6 there is shown another modified form of the invention in which the refrigerant plate comprises intermediate transverse plates 26 and 27 and terminal plates 28 and 29 spaced apart and connected together by slugs 30. This shape of refrigerant plate is adapted to pass around offset corners. In this modification also the slugs may be first spot-welded at one end to certain of the plates and subsequently spot-welded at the other end to the other plates.

In Figure 7 there is shown a modified form of invention in which the refrigerant plate comprises parallel plates 31, 32, 33, 34, 35, and 36 spaced apart and connected together by slugs 37 to provide alternate brine circulating and milk storage passages. In manufacturing this modified form of the invention slugs may be spot-welded at one end to each of the plates, and then the plates may be assembled in succession and as each plate is added to the group the ends of the slugs of the next preceding plate may be spot-welded to the plate.

In Figure 8 there is shown another modified form of the invention in which the refrigerant plate comprises two plates 38 and 39 with a substantially circular integral gas chamber 40. In this modified form of the invention the plates converge toward the lower ends and are connected together and properly spaced by slugs 41 which are first spot-welded at one end to the plate 38 and subsequently spot-welded at the other end to the plate 39. In all of the forms of the invention above described preferably, the slugs are all simultaneously spot-welded to one plate and subsequently all simultaneously spot-welded to the other plate, this being accomplished by special machinery suitable for the purpose.

In Figure 9 there is shown a form of the invention which is somewhat similar to Figure 1 and in this modified form of the invention the plates 42 and 43 are connected together and spaced apart by metal strips 44, spot-welded on one edge simultaneously to the plate 43 and subsequently simultaneously spot-welded at the opposite edge to the plate 42. As illustrated alternate strips terminate short of opposite edges of the refrigerant plate in order to provide serpentine refrigerant circulating passages between the walls of the plate.

From the above description it is thought that the construction and operation of the invention will be fully understood without further explanation.

What is claimed is:

1. A method of manufacturing a refrigerant plate without imposing metal stress in the plate, consisting of simultaneously spot welding one end of each of a plurality of metal reinforcing and connecting slugs to the face of a metal sheet, there appearing visible outlines of the ends of the weld on the reverse face of the sheet after the weld is made, reversely bending the sheet upon itself while forming an enlarged cylindrical gas chamber at the reverse bend of the sheet, the reversely bent portion of the sheet abutting the other ends of the slugs, and simultaneously spot welding said other ends of the plurality of slugs to the reversely bent portion of the sheet while using said weld outlines as guides to accurately apply the welding tool.

2. A method of manufacturing a refrigerant plate without imposing metal stress in the plate, consisting of placing upon the face of a metal sheet a template provided with metal reinforcing and connecting slugs presented endwise to contact with said face of the sheet at one end and be exposed through said template at the other end, simultaneously spot welding the first named ends of all of the slugs to the face of the sheet, there appearing on the opposite face of the sheet visible outlines of the welded ends of the slugs, reversely bending the sheet upon itself to abut the free ends of the slugs while forming a cylindrical gas chamber at the reverse bend, and simultaneously spot welding the free ends of the slugs to the reversely bent portion of the sheet while using said weld outlines as a guide to accurately apply the welding tool.

SAMUEL JENNINGS, Jr.